United States Patent
Huber et al.

(10) Patent No.: US 7,723,886 B2
(45) Date of Patent: May 25, 2010

(54) CONTINUOUSLY CONTROLLABLE MAGNETODYNAMIC GEAR

(75) Inventors: Gerhard Huber, Wasserburg/B. (DE); Günter Bauknecht, Ulm (DE)

(73) Assignee: Gesellschaft fur Aufladetechnik und Spindelbau mbH, Wasserburg/B. (DE)

( * ) Notice: Subject to any disclaimer, the term of this patent is extended or adjusted under 35 U.S.C. 154(b) by 643 days.

(21) Appl. No.: 10/579,977

(22) PCT Filed: Nov. 18, 2004

(86) PCT No.: PCT/EP2004/013085

§ 371 (c)(1),
(2), (4) Date: May 21, 2007

(87) PCT Pub. No.: WO2005/050824

PCT Pub. Date: Jun. 2, 2005

(65) Prior Publication Data
US 2008/0054748 A1    Mar. 6, 2008

(30) Foreign Application Priority Data
Nov. 21, 2003  (DE) ................. 103 54 604

(51) Int. Cl.
 *H02K 51/00*  (2006.01)
 *H02K 49/10*  (2006.01)
(52) U.S. Cl. ............ 310/102 R; 310/103; 310/113; 310/114; 310/156.49; 318/730
(58) Field of Classification Search ............ 310/114, 310/102 R, 156.49, 103; 318/730
See application file for complete search history.

(56) References Cited

U.S. PATENT DOCUMENTS

| | | | | |
|---|---|---|---|---|
| 925,504 A * | 6/1909 | Porsche | ............ | 310/115 |
| 2,795,711 A * | 6/1957 | Miller | ............ | 310/78 |
| 3,728,600 A * | 4/1973 | Shibata | ............ | 388/825 |
| 4,532,447 A * | 7/1985 | Cibie | ............ | 310/114 |
| 4,543,505 A * | 9/1985 | Dittner et al. | ............ | 310/102 R |
| 4,644,206 A * | 2/1987 | Smith | ............ | 310/115 |
| 5,675,203 A * | 10/1997 | Schulze et al. | ............ | 310/113 |
| 5,783,893 A | 7/1998 | Dade et al. | | |
| 5,994,809 A * | 11/1999 | Ackermann | ............ | 310/103 |
| 6,121,705 A * | 9/2000 | Hoong | ............ | 310/113 |
| 6,297,575 B1 * | 10/2001 | Yang | ............ | 310/266 |
| 6,794,781 B2 * | 9/2004 | Razzell et al. | ............ | 310/114 |
| 7,164,219 B2 * | 1/2007 | Hoeijmakers | ............ | 310/266 |
| 7,230,396 B1 * | 6/2007 | Martin et al. | ............ | 318/140 |

FOREIGN PATENT DOCUMENTS

| | | |
|---|---|---|
| DE | 4408719 C1 | 7/1995 |
| DE | 19604710 A1 | 8/1997 |

(Continued)

*Primary Examiner*—Burton Mullins
(74) *Attorney, Agent, or Firm*—Browdy and Neimark, PLLC

(57) ABSTRACT

The invention relates to a continuously controllable gear comprising a driving rotor rotatably driven by a power source which is provided with magnets uniformly distributed on the periphery thereof and produces, during the rotation thereof, a magnetic multipolar field in an ambient space rotating therewith. Said driving rotor is surrounded in the radial direction outwards with the primary air gap of a coaxial field concentrator which forms magnetoconductive pole shoes and is separated from a coaxial stator by means of a secondary air gap. The grooves of the stator are provided with sequentially short-circuitable windings.

16 Claims, 12 Drawing Sheets

FOREIGN PATENT DOCUMENTS

Figure 1:
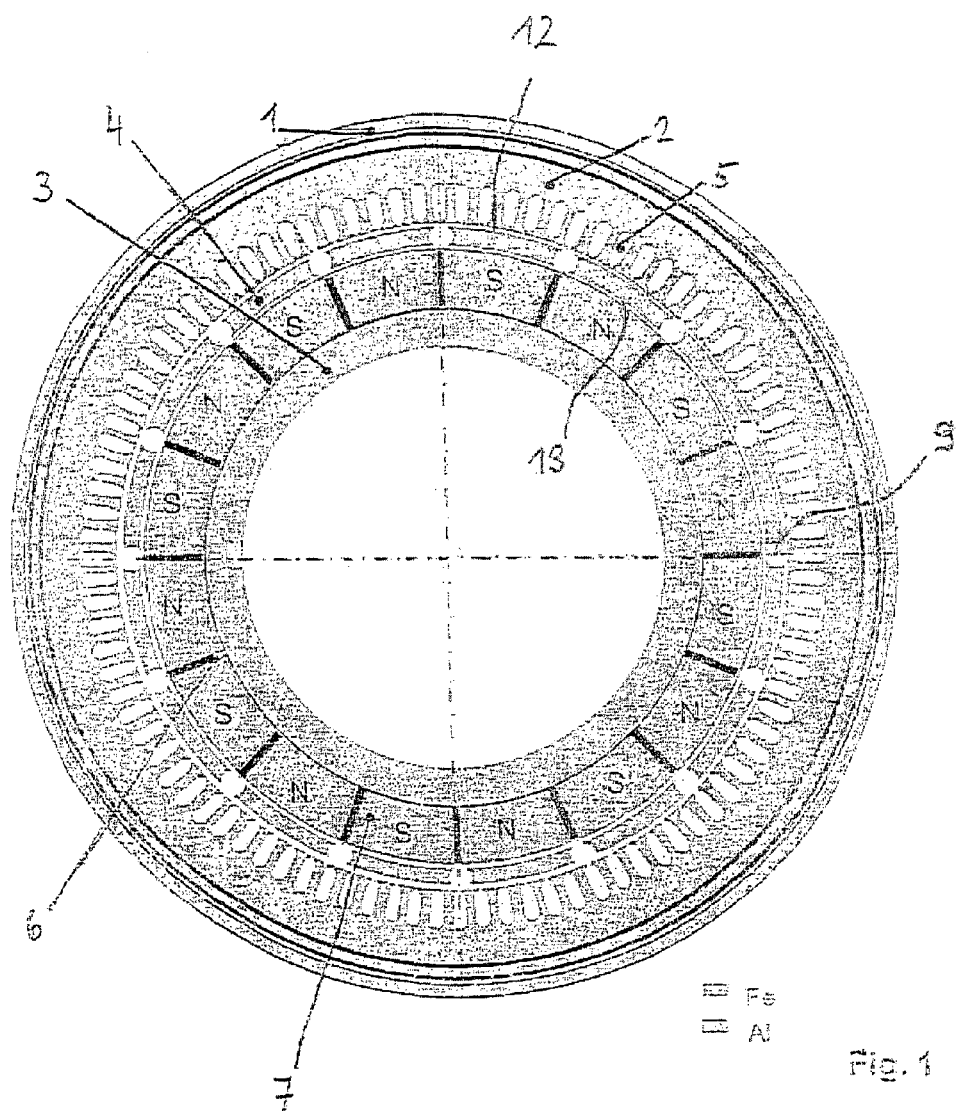

| | | | |
|---|---|---|---|
| DE | 19853516 | A1 | 5/2000 |
| DE | 19960168 | A1 | 6/2001 |
| EP | 0197849 | A1 | 10/1986 |
| EP | 1003271 | A2 | 5/2000 |
| EP | 1111762 | A2 | 6/2001 |
| EP | 1154551 | A2 | 11/2001 |
| GB | 2278242 | A | 11/1994 |
| JP | 2000065094 | A | 3/2000 |
| WO | 03075437 | A1 | 9/2003 |

\* cited by examiner

Creation of a Dynamic Effect in the Output Rotor Through
Induction of an Opposed Current in the Short-Circuit Loop Illustration 10    Developed View

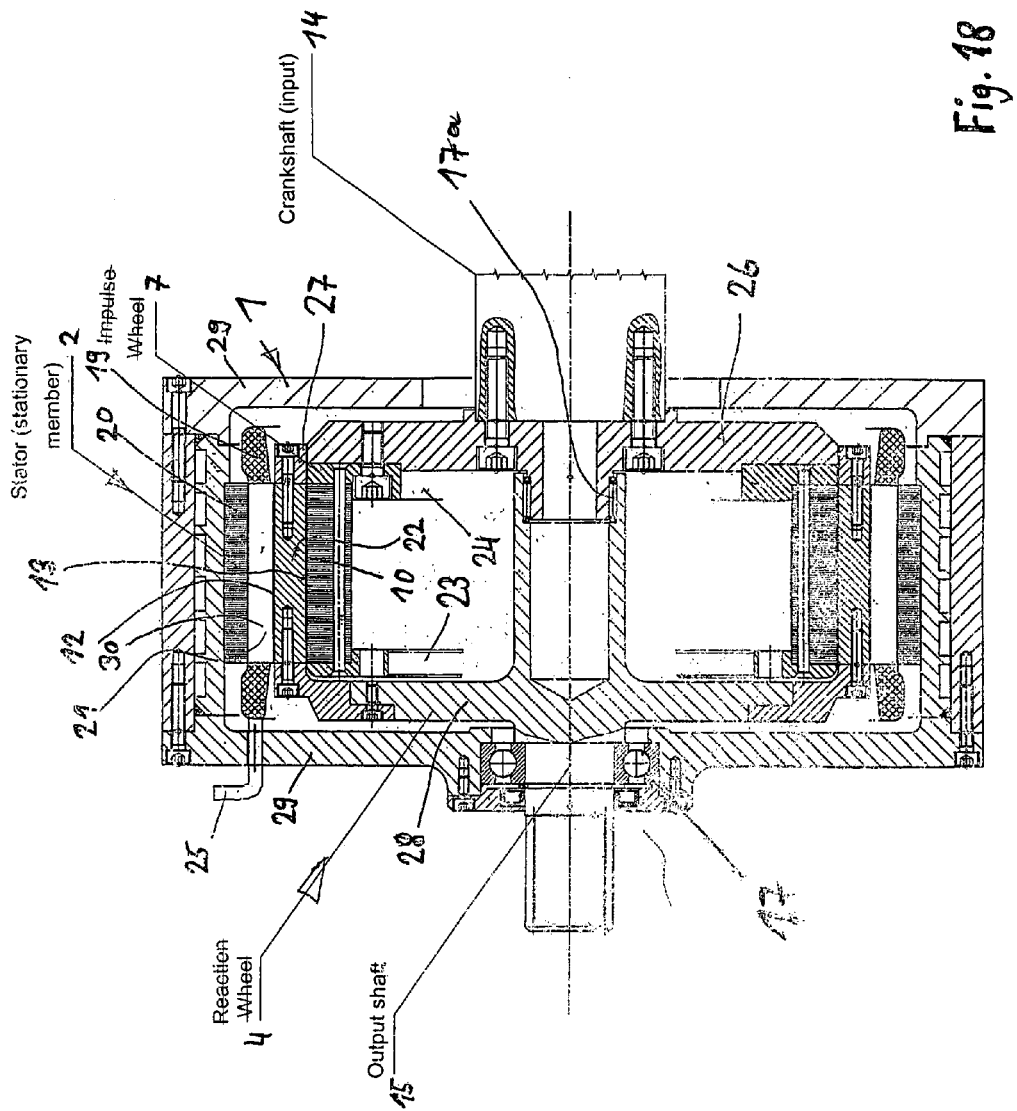

CONTINOUSLY CONTROLLABLE MAGNETODYNAMIC GEAR

The invention relates to a continuously variable magnetodynamic transmission.

A magnetodynamic transmission in which the gears are changeable only stepwise has become known, for example, with the subject matter of DE 19604710 and the quotation: Peter Graf von Ingelheim "Mechanik ade" ("Farewell, mechanics") in the German technical magazine "Das Industriemagazin" 19/2002, pages 42 through 45.

In the case of this magnetodynamic transmission, in which gears are principally changeable stepwise, continuous variability is intended to be achieved with the use of a downstream frequency converter. The cited printed publication, in principle, uses two motors, which can be selectively operated as a motor-generator set, and which are electrically connected to each other.

Owing to the use of two of these units, however, the shortcoming exists that relatively large amounts of copper are required for the windings, with the result that an increased electrical power dissipation occurs during the torque transmission.

The invention is therefore based on the object of improving a continuously variable magnetodynamic transmission of the above type in such a way that significantly lower percentages of copper result in smaller electrical losses, and the unit has smaller and more compact dimensions.

It is the gist of the invention to significantly minimize the electrical losses by avoiding the use of high copper percentages in the main path of the current.

For this purpose the invention provides for a magnetodynamic transmission, in which a rotor revolving on the inside is provided with permanent magnets and produces, during its rotation, a multi-polar magnetic field rotating with it in the ambient space. This revolving rotor serves as the impulse wheel. The rotor in this case is surrounded by a field concentrator. The latter consists of stationary, magnetically conductive pole shoes that correspond to the number of poles of the inside rotor.

The field concentrator may be equated in hydrodynamic analogy to the stator.

This system now has disposed around it the output rotor, the reaction wheel. The grooves are provided with windings, in this case in the form of a six-way grouping, which have the same number of poles as the stator. These windings can be sequentially short-circuited by means of appropriate electronics.

In contrast to an induction or synchronous arrangement, in which alternating or rotary currents are present in the main path of the current, a significantly lower percentage of copper is required in the case of the invention, due to the principle of the short-circuited windings in the output rotor.

Generally, for the purposes of the present description, the terms input side and output side shall be considered interchangeable. The invention therefore also applies to the analogue, that the input side is reversed with the output side, and vice versa. It is in this light that the terms "input rotor" and "output rotor" shall be understood as well. The present transmission, in principle, consists of three elements, namely an input element, an output element and a stationary element. Said three elements are spatially interchangeable with each other, and the implementation that will be described later in the preferred embodiment can easily be replaced with other spatially analogous embodiments.

It is essential with respect to the invention that short-circuiting rods are quasi switched on and switched off without the switching elements themselves having to carry current.

Since the windings can be considered short-circuiting windings (or also short-circuiting rods), carrying out these switching processes requires only relatively small-dimensioned switching elements. This is a significant difference over the prior part, in which large-dimensioned and relatively expensive switching elements were required.

The desired short-circuiting of the individual windings is accomplished electronically in this case.

The subject of the present invention is derived not only from the subject of the individual claims, but also from the combination of the individual claims among each other.

All information and features revealed in the documentation, including in the abstract, especially the three-dimensional implementation depicted in the drawings, are being claimed as essential to the invention to the extent that they are novel over the prior art, either individually or combined.

In the text that follows, the invention will be explained in greater detail based on drawings depicting only one possible embodiment. Additional characteristics and advantages of the invention that are essential for the invention will also become apparent from the drawings and from their description.

Figure 2:
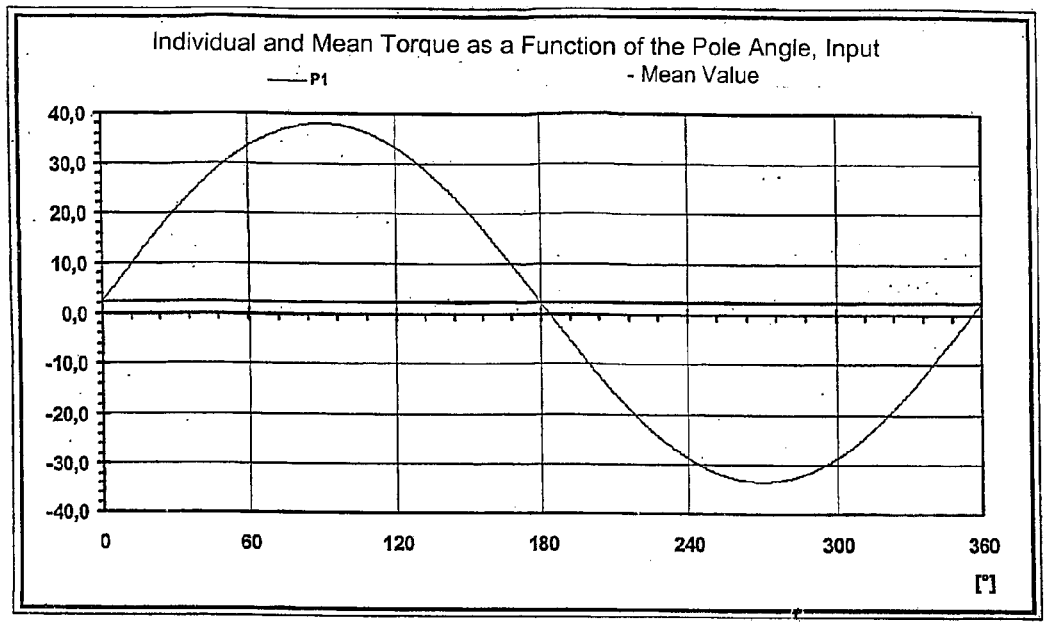
Figure 3:
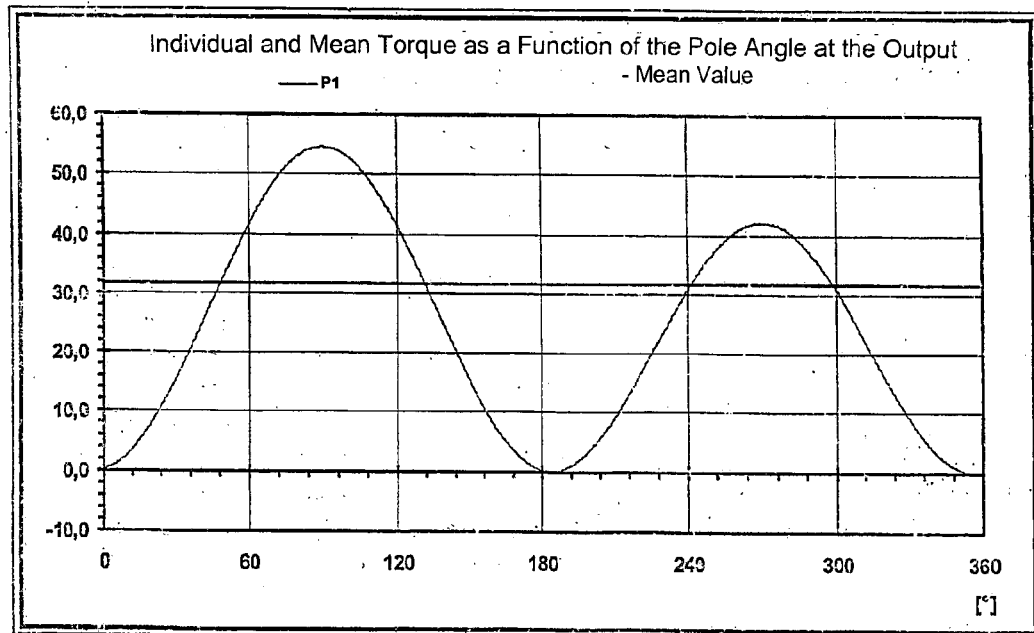
Figure 4:
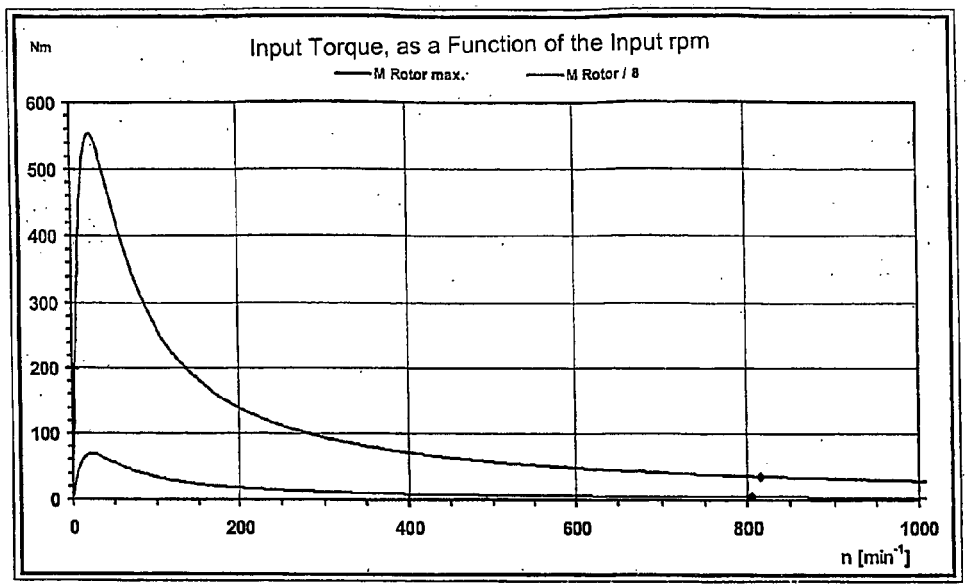
Figure 5:
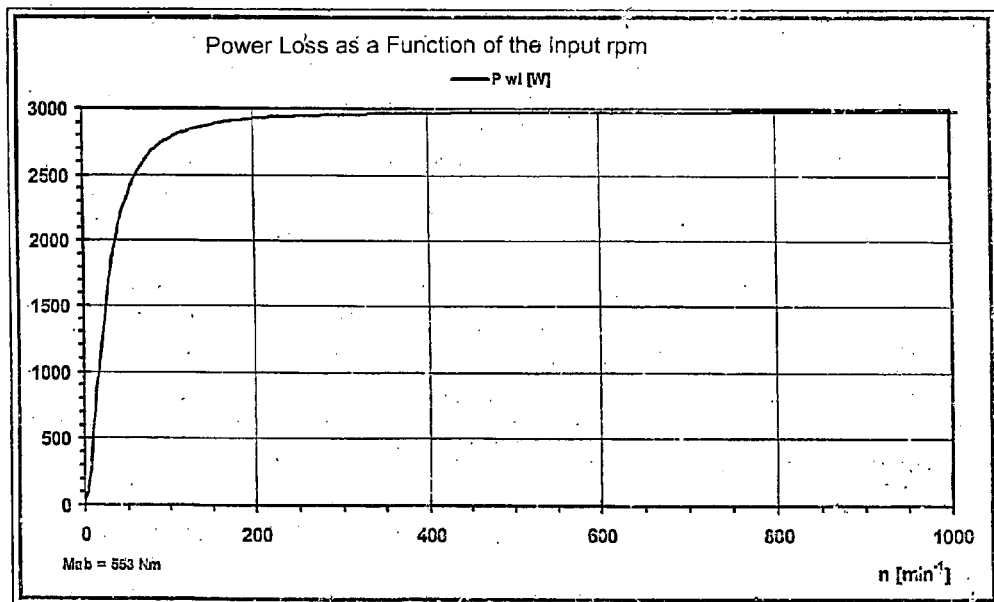
Figure 6:
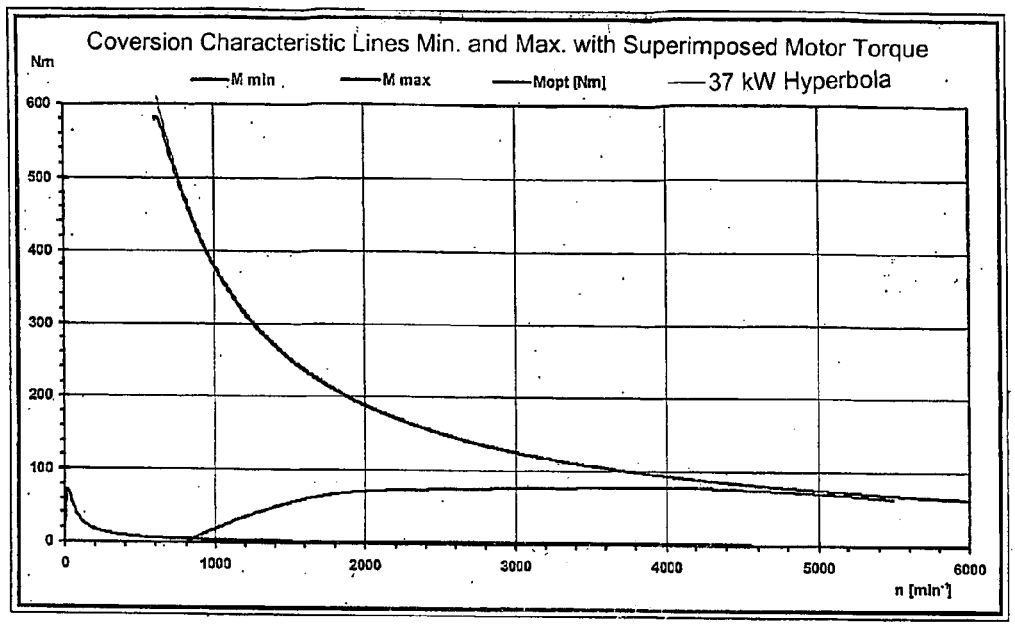
Figure 7:
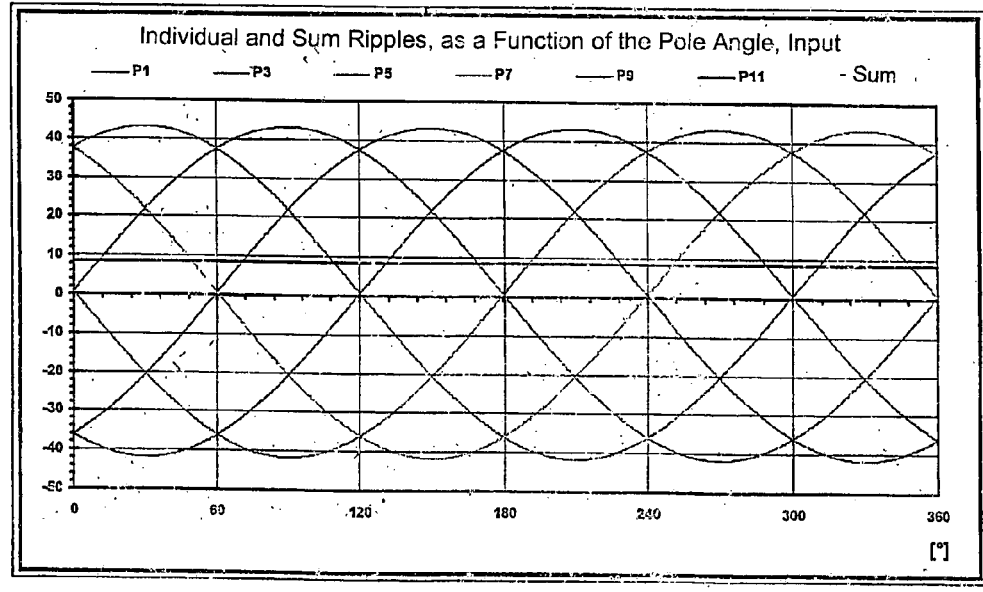
Figure 8:
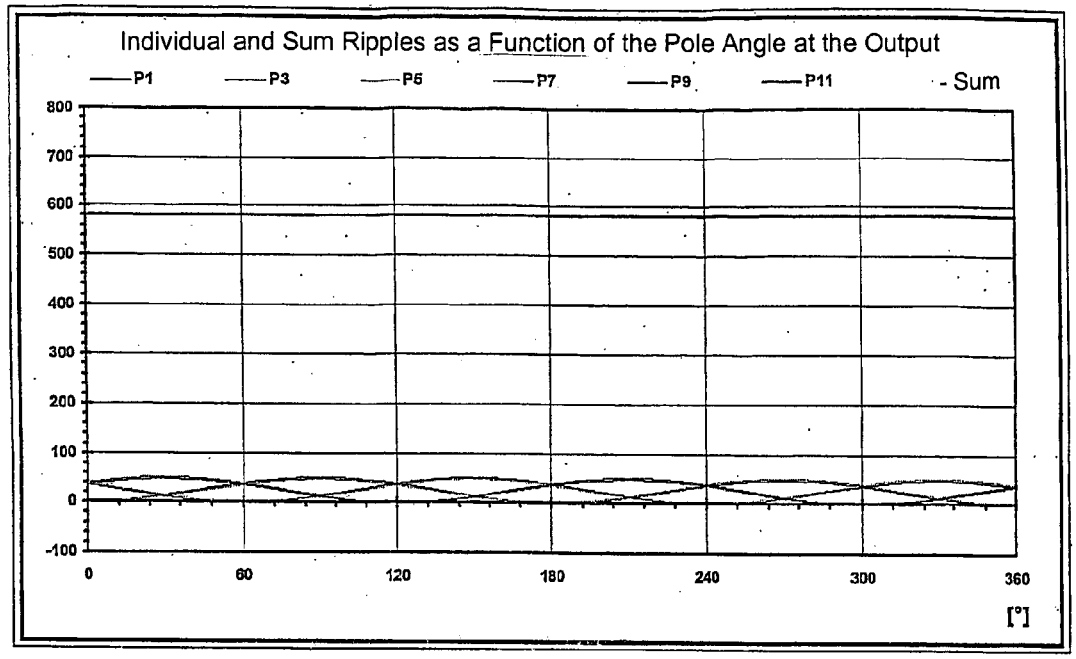
Figure 9:
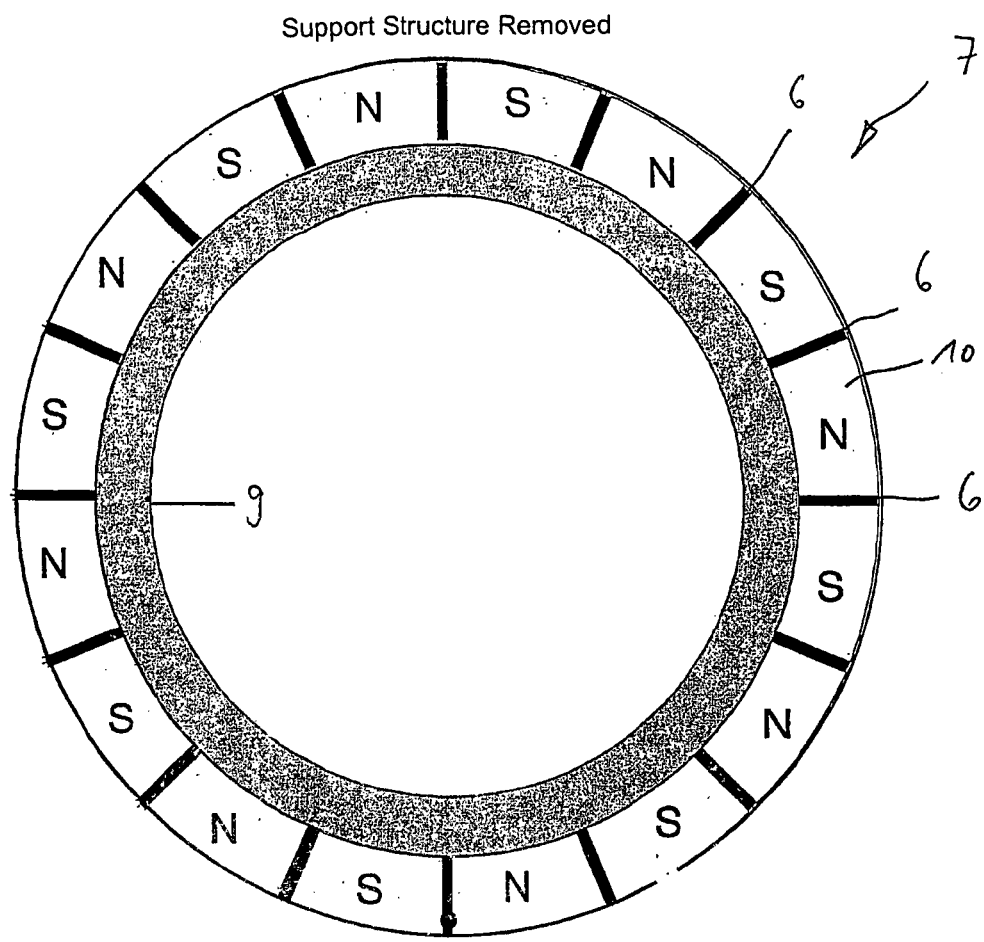
Figure 10:
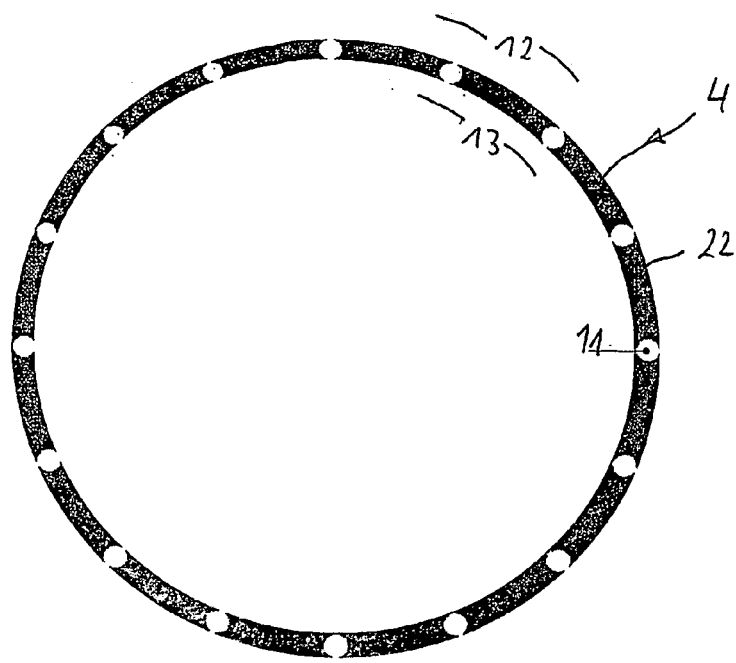
Figure 11:
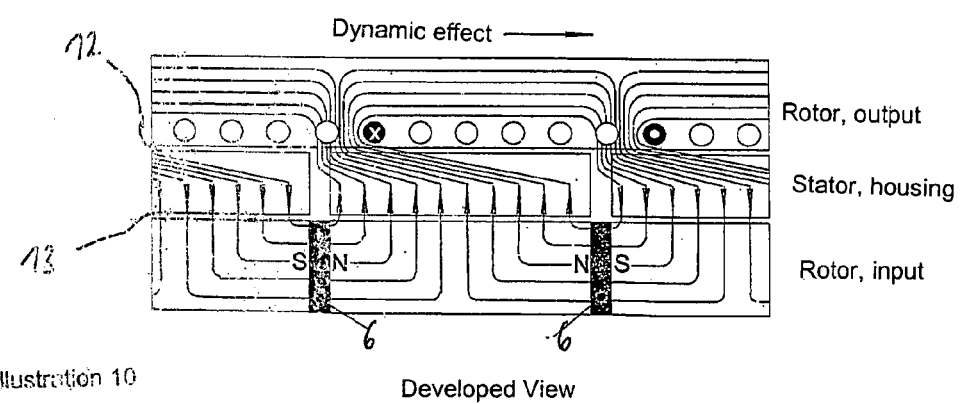
Figure 12:
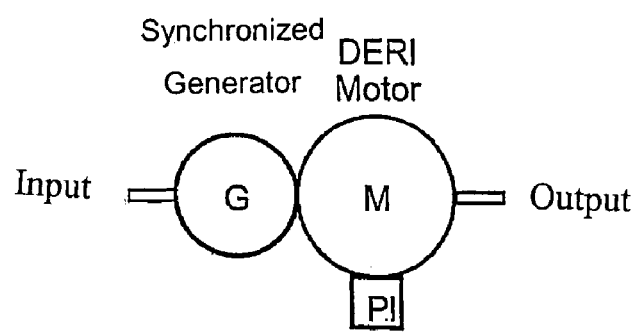
Figure 13:
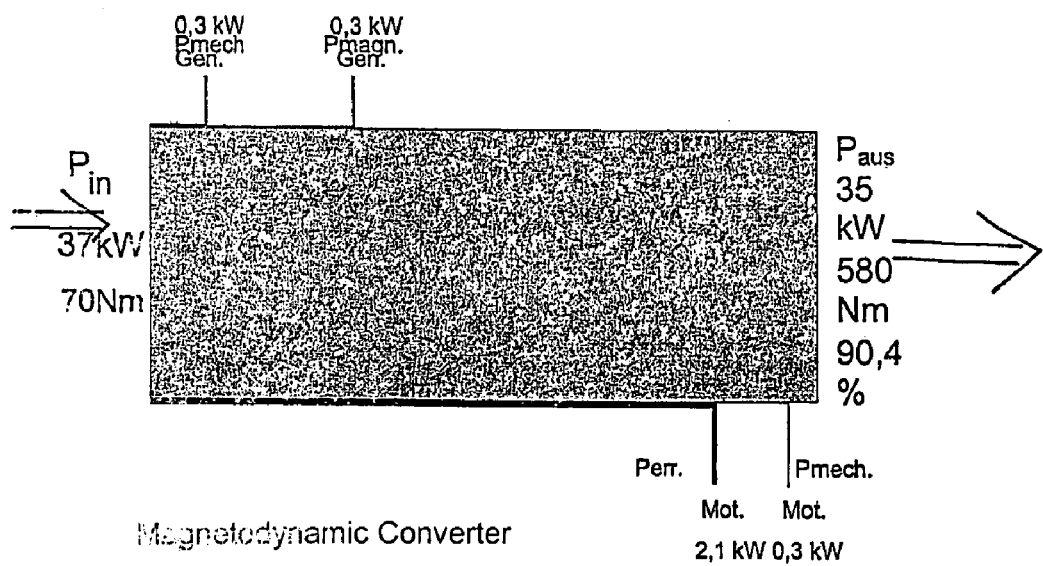
Figure 14:
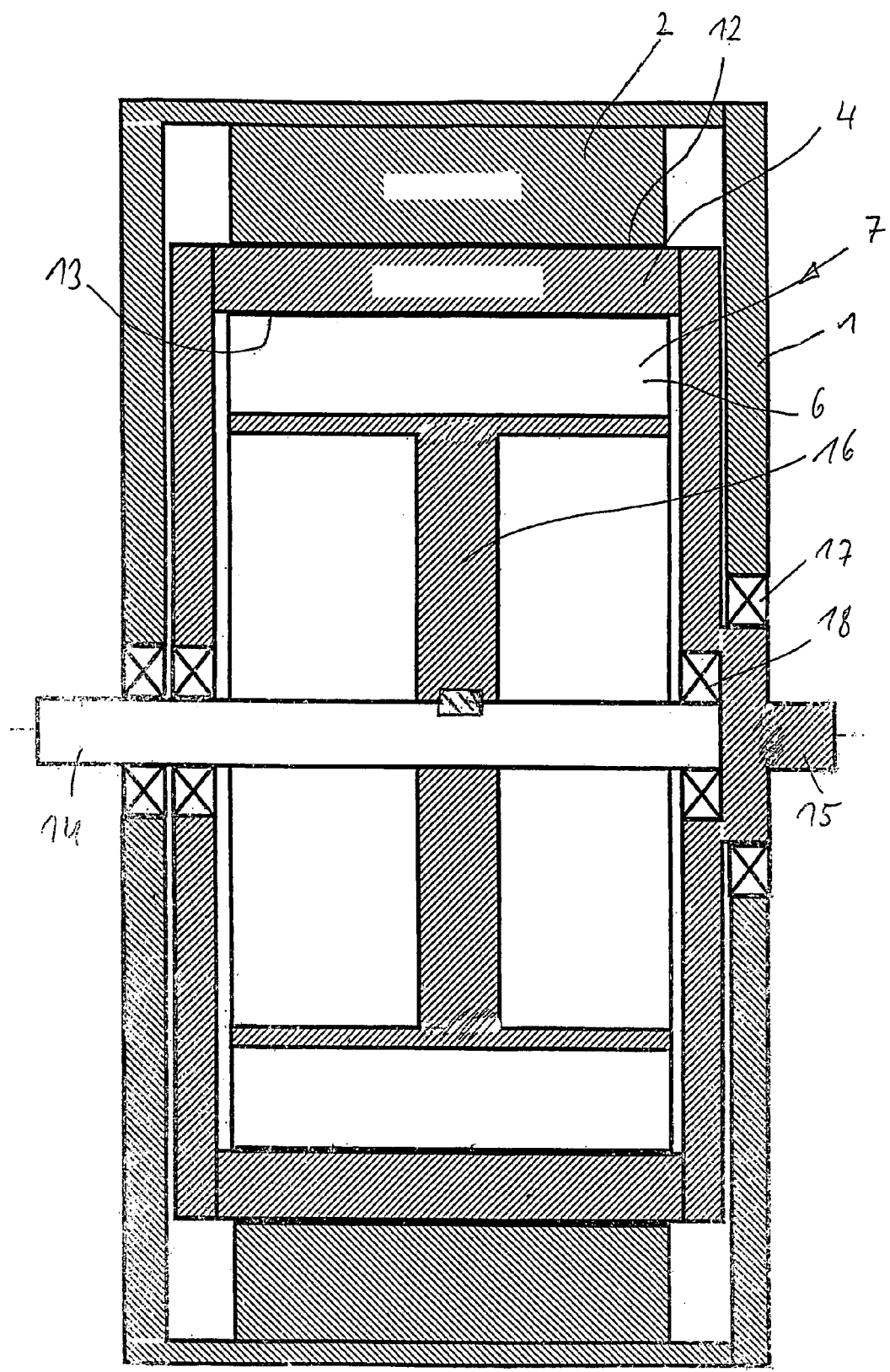
Figure 15:
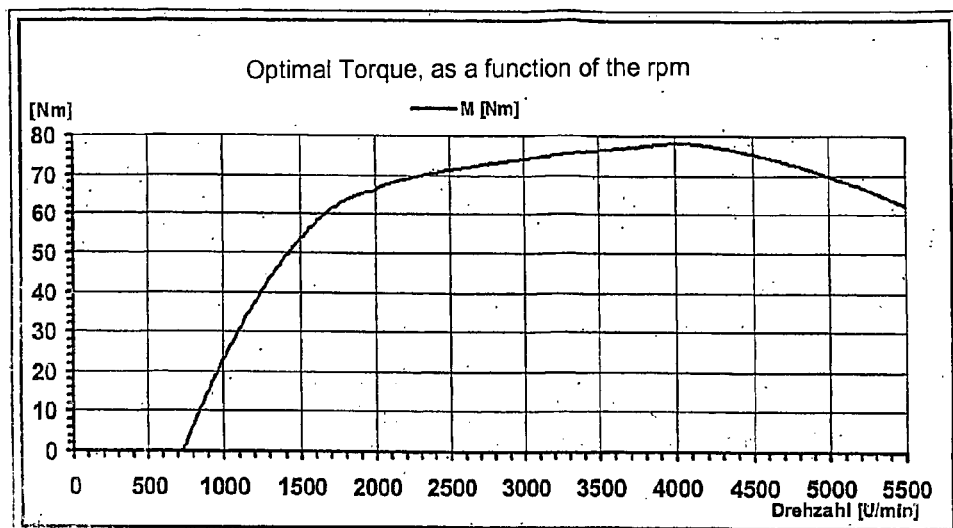
Figure 16:
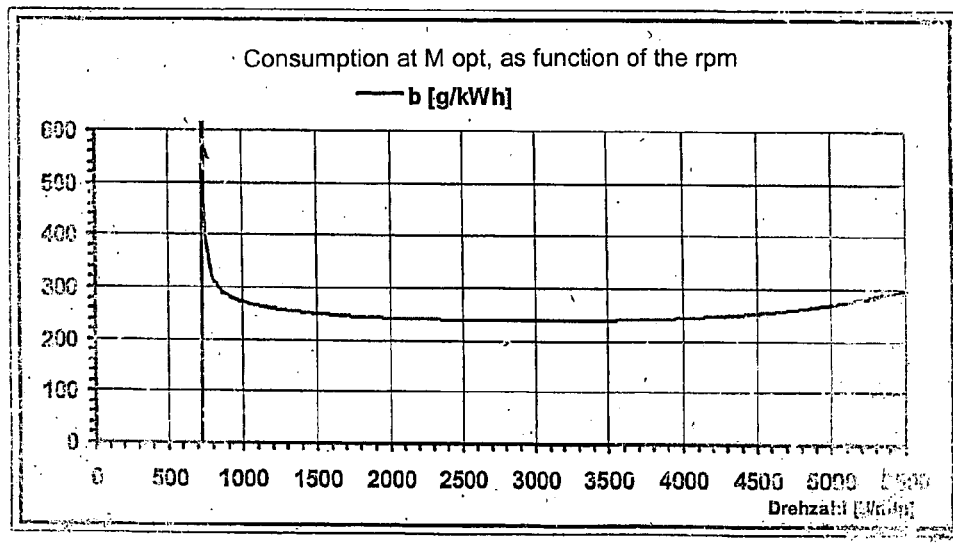
Figure 17:
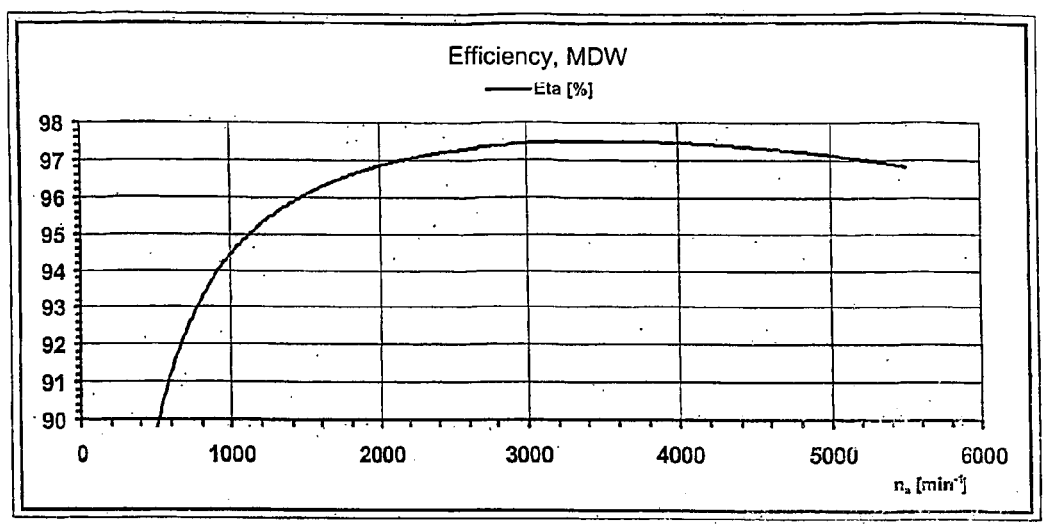

The figures show as follows:

FIG. 1: a schematic cross-section through a magnetodynamic transmission according to the invention in its basic design;

FIG. 2: a torque curve of a pole in the input rotor,

FIG. 3: a torque curve in the output;

FIG. 4: a torque curve with the output at standstill;

FIG. 5: losses plotted over the input rpm;

FIG. 6: a representation of the minimum and maximum conversion characteristic line;

FIG. 7: a presentation of the phase-shifted pole torques;

FIG. 8: the individual and sum ripple as a function of the pole angle;

FIG. 9: a schematic depiction of the design of a pole wheel composed of individual pole shoes;

FIG. 10: the basic design of a field concentrator;

FIG. 11: the creation of a dynamic effect in the output rotor through induction of an opposed current in the short-circuit loop;

FIG. 12: the chain of acting elements according to the invention;

FIG. 13: the associated power flow diagram;

FIG. 14: the basic design of a magnetodynamic transmission;

FIG. 15: the depiction of the optimal torque as a function of the rpm;

FIG. 16: the consumption by a motor vehicle in grams/kWh plotted over the rpm;

FIG. 17: the conversion efficiency at full load over the cardan shaft rpm;

FIG. 18: a section through a magnetodynamic transmission according to the invention.

The fundamental equations of the interaction between mechanics, electricity and magnetism are as follows:

$$M \sim \Theta / w \sim I \quad (1)$$

and $$n \sim d\Phi/dt \sim U \quad (2)$$

based on which the following applies:

$$P = U*I \sim d\Phi/dt*\Theta/w \sim M*n \quad (3)$$

The 3 fundamental equations can be read in both directions and state that a random product M1*n1 at the input, and a product from M2*n2 at the output must have the same value.

However, in order for a torque conversion to be able to take place, a converter of this type must be composed of three fundamental elements.

In analogy to the hydraulic converter that comprises the elements:

pump, stator, and turbine, in a magnetic system, these elements are:

impulse wheel, field concentrator, and reaction wheel.

In order to make the chain of acting elements easier to understand to begin with, the description in the following discussion will be based on the following configuration:

impulse wheel=input rotor field concentrator=stator
reaction wheel=output rotor

In a configuration of this type, a rotating part would have a winding and must be supplied with energy, or it supplies energy, for starter, booster and recuperation. The stationary element is disposed between the rotors.

This is an impractical solution, both from a mechanical design point of view, as well as from an electrical point of view.

Since dynamic effects are always reciprocal effects, however, it is always possible to chose a different setup.

The field concentrator is disposed so as to be rotatable and the reaction wheel is stationary.

The input and the output then represent a coaxial system, which is surrounded by a stationary part that also includes all electrical connections.

In hydrodynamics, the analogy is drawn here in the case of the Föttinger converter from the classic configuration:

pump-stator-turbine to the setup:

pump-turbine-stator.

FIG. 1 shows a section through a magnetodynamic converter in which a rotor revolving on the inside is provided with permanent magnets, and produces during its rotation a multipolar magnetic field rotating with it in an ambient space. This is the impulse wheel. To be equated in the hydrodynamic analogy to the pump.

This rotor is surrounded by the field concentrator, which are stationary, magnetically conducting pole shoes, initially corresponding to the number of poles of the inside rotor.

All that will be left to see for an observer viewing the revolving inside rotor from outside is a concentrated alternating field. The directional information from the driving side has thus been "lost". This is an important prerequisite in order to attain a force suspension. In terms of function, this is the field concentrator. To be equated, in the hydrodynamic analogy, to the stator.

This system is now surrounded by the output rotor, the reaction wheel. The grooves are provided with windings that have, in this case in the form of a six-way grouping, the same number of poles as the stator. The windings can be sequentially short-circuited by means of corresponding electronics.

FIG. 1 shows, in a schematic depiction, that a stationary housing 1 has disposed in it a stator 2 provided with radially inwardly extending winding grooves 5.

Disposed radially inward of the stator 2, separated by a secondary air gap 12, is a field concentrator 4 (stator) with rods 9 that are evenly distributed along its circumference.

Disposed radially inward of the field concentrator 4 and separated by an additional primary air gap 13, is an input rotor 7 that carries on its circumference evenly distributed, alternately polarized magnets 6. The input rotor 7 is mounted to an inside rotor 3 integral in rotation therewith.

The input takes place, for example, via the inside rotor 3, which then transfers the input rpm via the input rotor 7 to the field concentrator 4, which is connected to the output integral in rotation therewith.

Within the meaning of the above general description, however, the input and output may also be reversed.

It is also possible for the field concentrator 4 to stand still and for the stator 2 to revolve and function as the output in this case.

Assuming that the output stands still and all windings are short-circuited, the magnetic alternating field that extends over the pole shoes into the output when the input rotates, will induce a voltage, which, however, cannot build up toward the outside because of the short-circuit. Instead a current I flows in the coils, resulting in a magnetic field.

According to Lenz, this reaction field always acts to oppose the source field (Lenz's rule of inhibition). The effect is the same as if two identical magnetic poles tried to approach each other. A force is created in the input wheel that wants to prevent the pole wheel from coming into congruence with its pole shoes. If the input is able to force the congruence, the dynamic effect is reversed after the point of congruence has been crossed, and the input is supported in its effort to move away from the pole of the pole shoe.

Alternatively, the coils in the reaction wheel can be moved out of the field range as well, which is why forces of reaction act on the coils that attempt to force them out of the magnetic field. As long as all coils are short-circuited, the forces are left-turning in one half, right-turning in the other half. If not all coils are short-circuited at the same time in the reaction wheel, a torque is created in the output. The force acting on the input is identical in its amount to the force acting on the output. As opposed to the force on the input, the direction of the force in the output does not change, because of the selective actuation of the coils.

FIG. 2 shows the torque curve of a pole in the input rotor, under the idealized assumption that the coil current could be generated without losses in the output.

It is apparent that, during passage through a pole pitch, a significant sinusoidal oscillating torque occurs, whose mean value, however, would become zero in the ideal event that no power was consumed in the system. The system therefore always alternates between generator and motor operation. In practice, however, the input must compensate for the system losses. The torque curve is therefore not symmetrical. The generator interval is longer than the motoric interval. The resulting mean torque is one that correlates to the power loss in the system.

FIG. 3 illustrates the torque curve in the output. There is no torque reversal in the output. It is apparent, however, that the torque ripples in the input and output are of comparable magnitude.

At start, considerable hunting of torque speed must therefore be expected in the input, and corresponding vibration torques in the output.

Once the output starts to rotate, the short-circuited coils move out of the pole field in accordance with the given dynamic effect. The pole overlap becomes smaller, and hence also the magnetic flux that permeates the coils. In the context of time progression, this means a flow change −dΦ/dt. As a result, I, and therefore also the force of reaction, becomes smaller. The input must run faster for dΦ/dt to be compensated for.

In FIG. 4 the torque curve is shown, with the output standing still, over the input rpm. Once at maximum load and, for comparison at partial-load behavior, also at one-eighth load. This curve is comparable to the pull-out lines of induction motors.

The curves, in their progression, show the conversion characteristic lines to the right of the maximum value. All rpm and torque pairs located on these lines are convertible into each other.

At 805 l/min the intersection point with the conversion characteristic line lies at 4.4 Nm for partial load (red line). At this input speed an output torque of 69 Nm can be attained at 24 l/m output rpm.

When the motor rpm is increased to 827 l/min the intersection point with the conversion characteristic line for full load (black line) is at 33 Nm. At this input rpm an output torque of 556 Nm can be attained at 24 l/min output rpm.

By regulating the excitation in the coils, effected by shifting the commutation points in relation to the poles of the field concentrator, any conversion characteristic line can be reached from 0 to $M_{max}$.

The conversion characteristic line for $M_{max}$ relates to the "worst case" losses for an MDW. The losses that occur in the process over the input rpm are illustrated in FIG. 5

It is significant that, in comparison to the losses at start in a hydraulic converter, the losses in the MDW are significantly smaller. FIG. 5 shows the diagram of the losses in the case of a blocked output (standstill function).

Of the illustrated losses 88% occur in the reaction wheel, due to the Joule effect in the reaction windings and in the adjuster.

According to the fundamental equation (1)

$$M\sim I$$

and accordingly $$Pv\sim M^2$$

the power loss can therefore be calculated for other torques according to:

$$Pv=(M/580)^2*3000[W]$$

Since, at a volume comparable to a hydraulic converter, the power loss at start is only approximately ⅕ in the MDW, all driving profiles can be managed with significantly less problems than in the case of a power shift transmission.

It is even conceivable to operate the entire unit with convection cooling.

This renders any preventive measures against interferences in a ducted cooling system unnecessary. Effects such as a coasting of temperature caused by the exhaust are conditional on the design and installation and can probably only be answered definitively after thorough "package studies". It should be noted, however, that the thermally critical components, such as electrolytic capacitors in the control equipment, magnets, transistors, already exist today in control equipment that is located near the motor, without unacceptable interruptions having been reported FIG. 6 shows the minimal and maximal conversion characteristic line, with a superimposed engine operation characteristic line for optimum consumption and, for comparison purposes, the power hyperbola 37 kW. It is apparent that the maximal conversion characteristic line factually coincides with the power hyperbola, the remaining deviation is explained by the unavoidable losses.

All conversion characteristic lines, from standstill in neutral—which, like in the case of the hand gear shift, can also be rendered without residual overrun—to the maximal line, are lines of constant power.

Once the output starts to rotate, the conversion characteristic line shifts to the right until the load limit of the input motor minus the internal losses of the converter is met. In the process, its intersection point continually shifts to the right toward higher revolutions per minute.

Torque Ripple and Noise

As previously explained in FIGS. 2 and 3, the input and output torques are accompanied by considerable ripples. However, this is unacceptable for the practical application.

A solution is brought about in such a way that the number of poles of the input and output rotor is different by 2.

The input rotor has 22 poles and the output rotor has 24 poles. As a result of this measure the torque ripples do not occur in all poles in the same phase position, but offset by ¹⁄₁₃ relative to one revolution. This results in an essentially completely ripple-free torque curve, both in the input, as well as in the stator. The remaining noise can be explained in both cases with the fact that a discontinuity of the air gaps is unavoidable in the pole gaps and effective gaps. One may therefore anticipate that the vibrations and the noise caused by them correspond to those of conventional electric motors.

FIGS. 7 and 8 show the phase-shifted pole torques and their addition for the input and output. For ease of viewing, however, only every second curve line is depicted. For the sum torque, however, all pole torques have been included with their instantaneous values.

A contemplation to utilize the MDW also as a compensator for the torque ripple of the ICE could become difficult since a counter-ripple needs to be artificially created because of the self-compensating MDW ripple.

Moreover, it appears to make more sense to compensate vibrations of that type directly at the cranks and not centrally on the "flywheel", since the torsion of the crankshaft is not prevented in this manner, but rather increased instead.

Generation of the Generator Excitation, Impulse Wheel

With respect to the losses, it makes most sense to provide for a permanent excitation of the generator pole wheel.

The usual method of gluing curved magnets onto the pole shoes of a pole wheel is not suitable for this application. The flow that is attainable with the use of cap-type magnets is too small to attain the desired high torque density.

It presents itself to produce the pole wheel (input rotor 7) in accordance with FIG. 9 from individual pole shoes 10. This creates radial grooves between the pole shoes 10 into which plate magnets 6 are then inserted on edge.

The individual pole shoes 10 are not mechanically connected to each other, which is why lateral bearing disks of a non-magnetic material on an interior tube 3 are permanently riveted to the pole shoes 10.

To prevent barrel-shaped deformations of the pole shoes 10, identical pole shims are riveted-in every 40 mm as well for long rotors. For the POC pole wheel with a length of 120 mm, two pole shims are required.

FIG. 9 shows that the permanent magnets 6 are thin, disk-shaped members that are oriented radially outward. Configured between these magnets 6 are magnetic pole shoes 10 consisting of a magnetically conductive material. This material may be, e.g., an iron material, or a laminated iron material. The pole wheel diameter is specified as 245 mm.

In the case of the POC motor, an adjustability of the field in the rotor will be dispensed with, as this will allow the setup to become significantly simpler. Slow idle will be effected via the reaction wheel adjuster.

Field Concentrator, Output

FIG. 10 shows the design of the field concentrator 4. It is for the generator and motor together and consists of laminated poles 22 having a number of poles that is greater by 2 than that of the pole wheel. In the POC implementation the number of poles is 24.

The field concentrator consists of 24 circular segments, which, like in the case of the pole wheel, are produced with a support structure of non-magnetic material.

Since no back closure needs to exist in the field concentrator 4, the pole height must be designed such that the forces are transmittable. The segments have a thickness of 12.5 mm, so that the inside diameter of the fully assembled wheel is 246 mm and the outside diameter is 271 mm. In the pure converter arrangement the stator is without coils that would have to be enclosed.

When the input pole wheel (drive rotor 7) is rotated under the stator 2, an alternating field is created in the secondary air gap 12, whose frequency corresponds to the product of the input number of rotations per second and number of pole pairs. The field in the output rotor (stator 2) then corresponds to the field in the secondary air gap 12. A one-phase alternating field of this type is the starting condition for the DERI motor shown in FIG. 12.

Reaction Wheel, Stator

FIG. 11 shows how a force is generated in the output rotor when the opposing field generated by the output rotor displaces and weakens the air-gap field. In the short-circuit loops, a current I flows, which, like B, is dependent upon $\Theta$ of the input pole wheel and creates a torque in the output.

$$M \sim I * B \Theta \sim \Theta^2 \quad (4)$$

When the output rotor moves in the sense of the created torque, this corresponds to a change in the pole overlapping area, i.e., a change over time of the opposing field. This means a current, comparable to the opposing e.m.f. in normal motors. According to equation (3), this, in combination with $\Theta$, produces power.

Magnetic energy is converted into mechanical energy. The weakening of the field that results from the field distortion according to FIG. 11 means that the corresponding energy difference must be made available by the pole wheel, which corresponds to a force in the impeding sense onto the input pole wheel.

Since the field always extends over the field concentrator poles, an interaction always exists only between the former and the respective rotor. This means that different forces can build up in both air gaps. The only condition is that the energy equation must be met.

As already explained, a control of the sequential switching of the short-circuited conductor loops is needed in the output rotor.

$$T = 360/6 + tn° \quad (5)$$

The adjuster is modular and consists, per branch, of 4 transistors in H-circuit arrangement and a hall sensor that detects the spatial position of the coil branch relative to the field concentrator poles.

These modules must allow the following operation modes:

In the "neutral" mode all conductor loops are continuously short-circuited so that in this mode a torque-free position is reached independently from other conditions.

In the "drive" mode, three of the six branches are short-circuited. The selection of the two groups determines the driving direction. The shifting of the On and Off switching angles determines the torque.

In the "sum" mode the activated coil branches are actuated with a PWM signal in such a way that the coil current can be raised. This makes it possible to implement the functions "starter" and "booster".

In the "difference" mode the activated coil branches are actuated with a PWM signal in such a way that the coil current can be lowered. This makes it possible to implement the functions "generator" for the vehicle electrical system, or "regenerative braking".

When the adjuster is synchronized with the frequency of the running input motor, energy can be added or removed through same-phase or opposite-phase voltage in the winding.

This modular design creates a certain amount of redundancy since, if one of these branch systems fails, only this one branch no longer contributes to the torque, so that 5/6 of the power are still available.

Serial Magnetodynamic Converter

FIG. 12 shows a chain of acting elements with the associated power flow diagram according to FIG. 13 for a serial magnetodynamic converter.

It is apparent, no doubt, that degrees of conversion efficiency can be attained with this type of system that rival those of shift transmissions. This is explained mainly by the absence of any coils and controls in the main path of the current.

Except for the controller for the MDW management, no external energy source is required.

Additionally, due to the significantly lower iron masses, the motors are no larger, despite their serial mode of operation, than in the case of an EIVT of the same throughput.

For an input torque of 80 Nm and output torque of 580 Nm, a motor of this type could be implemented with the dimensions: d=335 mm and l=150 mm.

This requires air gap diameters of 245 mm and 271 mm at an iron length of 110 mm.

This arrangement can be made significantly smaller if the torque is reduced in the output while increasing the rpm, and then subsequently raised back up in a gear system. This also permits an offset of shafts (front-wheel drive).

FIG. 14 shows a principle design of an inventive magnetodynamic transmission.

The individual elements are shown in a structural depiction, taking into consideration the basic design in FIG. 1.

An input shaft 14 is connected to a bearing disk 16 integral in rotation therewith, which, in turn, is connected to the input rotor 17 integral in rotation therewith.

The input rotor 7 carries—in accordance with the illustration in FIG. 1—magnets 6 that are distributed along its circumference, which are not visible in the drawing because the drawing section through the laminated iron cores extends between the magnets 6. In a radially outward direction, a primary air gap 13 is formed toward an outer revolving field concentrator 4. The latter is supported in the form of a cup-shaped part in bearings 18 on the input shaft 14.

Disposed radially outward from the field concentrator 4 is the secondary air gap 12, adjoining which, radially outward, is the stator 2.

The stator 2 is implemented in the form of a cup-shaped housing with an iron part. It is rigidly connected to the housing 1 and the output shaft 15 is supported on the stationary housing 1 by means of bearings 17.

Control Strategy

In the case of hydraulic and manually shifted transmissions it is generally sufficient to control with the accelerator pedal only the ICE (internal combustion engine). In the case of stepless converters this is no longer appropriate, since emphasis is placed not only on the speed adjustment but also on the optimization of the consumption.

As presented above, all conversion characteristic lines factually are the associated power hyperbolas. When the driver's intent is initially processed in the MDW control, the adjuster aims for the conversion characteristic line that is associated with the accelerator pedal position. The motor control is then presented with the desired value that matches the motor performance characteristics, so that an intersection point of the motor operating point with the conversion characteristic line is created. The resulting transmission ratio is therefore always equivalent to the engine output.

For the case of a delay, an overrun may be specified, which recouperatively transfers the energy into the vehicle electrical system. The ICE is relieved in this manner by the overrun operation. The absorbing capacity of a 42V vehicle electrical system is sufficient for the overrun power. At 12V the overrun operation would either have to be restricted or carried off to the ICE in a controlled manner.

Conversely, the output power during booster operation can be increased by applying power from the vehicle electrical system beyond the maximum ICE output, at least within the framework of what the vehicle electrical system can supply.

During normal operation, the commutation with the output (in this case the field concentrator) is synchronous. By means of a targeted adjustment of the commutation by the value $f/p_1 + f/p_2$ the ICE can be started both with the vehicle at standstill, even though with blocked output, as well as with the vehicle driving. The attainable starting torques correspond to the output torque.

The output blockage when the vehicle is at standstill is meaningful, as vibration torques are transferred to the output during the starting process, which can be traced back to the field penetration. When the output rotates, they are smoothed by the inertia of masses (overrun cut-off).

Driving Dynamics

A simulation was performed for the POC in order to demonstrate the starting acceleration and elasticity. The simulation was based on an assumed vehicle in the class of a Lupo, and an engine data characteristic diagram was prepared similar to that of the M43 at reduced power. The optimum engine operation characteristic line was then extracted from it. FIG. 15 shows the engine operation characteristic line and FIG. 16 shows the corresponding specific consumption in g/kWh.

The MDW adapts this engine operation characteristic line with each vehicle movement and reflects the conversion for the current driving condition that corresponds to the driver's intent.

In FIG. 17 the efficiency is calculated at full load over the rpm of the cardan shaft in a warm-engine operating condition.

With these values a comparison to a shift transmission is possible at any time.

A simulation of the acceleration times reveals tractive forces on the wheel of 7.9 kN in the start range, which is presumably more than a vehicle of the Lupo class can manage.

A drop below the adhesion limit occurs only at a speed of 30.5 km/h; an anti-skid protection must be in effect until then.

FIG. 18 illustrates additional details of a magnetodynamic transmission according to the invention. The same explanations that were provided above apply for the same reference symbols.

The input shaft 14 is implemented in the form of a crank shaft, whose frustum is connected by means of screws to a flange element 26 integral in rotation therewith, which, in turn, carries the input rotor 7.

Screwed to the inside of the bearing flange, across from each other, are holding rings 23, 24 that carry in a radially outward direction the laminated and riveted magnetic pole shoes 10. Embedded between these pole shoes 10, according to FIG. 1, are the permanent magnets 6, which are not shown in the section in FIG. 18.

Adjoining in a radially outward direction from the input rotor 7 is the primary air gap 13, and provided opposite the same is the field concentrator 4. The latter substantially consists of a sleeve-shaped ring element 22 of iron that is fixed on a support ring 27.

The field concentrator 4 is connected to an output flange shaft 28 that forms a single piece with the output shaft 15. The latter is rotatably supported by means of the bearings 17 inside the housing 1. The housing 1, in this case, is connected to the motor flange integral in rotation therewith.

Disposed extending radially outward from the field concentrator 4 is the secondary air gap 12, adjoining which, in turn, extending radially outward, is the sheet steel core of the stator 2.

The sheet steel core is marked with the numeral 20 and carries a radially outwardly extending cooling sleeve 21 with corresponding cooling channels. These cooling channels have a cooling medium flowing through them.

The stator 2 in this case is accommodated between two bearing disks and screwed in place between the bearing covers 29 by means of axially oriented screws.

For clarification purposes, it shall be added that the bearing 17 forms the bearing for the output shaft on the housing 1 on the left, whereas the bearing 17a forms the bearing for the output flange shaft 28 on the crank shaft (input shaft 14) on the right.

The stator 2 has end windings 19 that energize a winding disposed in the groove 30 of the sheet steel core 20.

The transmission ratio between the input shaft 14 and output shaft 15 is now controlled in such a way that the number of revolutions of the output shaft 15 are measured by a corresponding rotation sensor which is disposed, e.g., on the output flange shaft 28; with the aid of electronics that are connected to the winding connections at the winding connector 25, short-circuits are now applied in the individual windings of the end windings in accordance with the desired transmission ratio between the input and output.

The basic circuit diagram according to FIGS. 19 and 20 is appended to provide more explanation in this context.

The inventive transmission permits not only a gearing down and gearing up, but also a reversal of the direction. The field angle between the field concentrator and stator may be set leading or lagging, which is associated with a corresponding reversal in direction.

It is therefore important that it is possible with the inventive transmission to drive forward and backwards, which is not possible with conventional transmissions.

In a further development of the present invention provision is now made that the current induced in the short-circuiting windings can be used, for example, to charge a battery. The inventive transmission can thus accordingly also operate as a generator.

Due to the high torque that can be generated with this transmission, this transmission can also be used as a starter motor of the internal combustion engine. Additionally the inventive magnetodynamic transmission also replaces a conventional flywheel in the vehicle.

The control electronics can be used to preset an appropriate driving strategy, which ensures that the driving internal combustion engine always operates at an optimum consumption.

Also, during brake operation of the vehicle, the braking energy can be reclaimed via the inventive transmission in the form of an electric current.

Additional power may be applied from the battery during acceleration processes of the internal combustion engine to apply an additional torque by the magnetodynamic gear to the output of the internal combustion engine. This corresponds to a booster function.

DRAWING LEGEND 1 housing
2 stator
3 interior tube
4 field concentrator
5 winding grooves
6 magnet
7 input rotor
8
9 rods
10 magnetic pole shoes
11 pole gap
12 secondary air gap
13 primary air gap
14 input shaft
15 output shaft
16 bearing disk
17 bearing 17a
18 bearing
19 end windings (stator)
20 sheet steel core
21 cooling sleeve
22 ring element (iron)
23 holding ring
24 holding ring
25 winding connector
26 flange element
27 support ring
28 output flange shaft
29 bearing cover
30 groove

What is claimed is:

1. A continuously variable magnetodynamic transmission comprising:
   an input rotor (7) driven by a power source and provided with magnets (6) and pole shoes (10) that are evenly distributed along its circumference, said input rotor (7) producing during its rotation a multi-polar magnetic field revolving with it;
   a coaxial field concentrator (4) comprising magnetically conductive pole shoes; and
   a coaxial stator (2) having grooves (5) and windings in said grooves, said windings being sequentially short-circuited during operation,
wherein: said input rotor is surrounded radially outwardly by said coaxial field concentrator and is separated from said coaxial field concentrator by a primary air gap (13): said coaxial field concentrator is surrounded radially outwardly by said coaxial stator and is separated from said coaxial stator by a secondary air gap (12); and said coaxial field concentrator is rotatable relative to said coaxial stator.

2. A transmission according to claim 1, characterized in that the windings of the stator (2) are sequentially short-circuitable in groups, and the number of groups of windings that are switched together corresponds to the number of pole shoes (10) of the input rotor (7).

3. A transmission according to claim 2, characterized in that the number of poles of the input rotor (7) and the coaxial stator (2) differs by 2.

4. A transmission according to claim 3, characterized in that the number of poles of the input rotor (7) is 22 poles and that of the coaxial stator (2) is 24 poles.

5. A transmission according to claim 1, characterized in that the field concentrator (4) is implemented in the form of a pole wheel and the individual pole shoes consist of radially oriented permanent magnets (6) between which, evenly distributed along the circumference, a magnetically conductive material is disposed.

6. A transmission according to claim 1, characterized in that a control of the sequential switching of the short-circuited conductor loops takes place in the stator (2) according to the equation $$T=360/6+tn°$$

and that said transmission further comprises a modular adjuster having, per branch, 4 transistors in H-circuit arrangement and a hall sensor that detects the spatial position of the coil branch relative to the field concentrator poles.

7. A method for operation of the magnetodynamic transmission according to claim 6, characterized in that the stator grooves carry six windings and the transmission operates using at least one or more of the following operating modes:
   a "neutral" mode in which all conductor loops are continuously short-circuited so that in this mode a torque-free position is reached independently from other conditions; and
   a "drive" mode, in which three of the six windings are short-circuited, the selection of which windings are short-circuited determines the driving direction, and a shifting of the On and Off.

8. A method according to claim 7, characterized in that the power source is an input motor and the adjuster, with the input motor running, is synchronized with its frequency, and energy is thus added or removed in this manner at equal-phase or opposed phase voltage in the winding.

9. A method for operation of a magnetodynamic transmission according to claim 7, characterized in that the transmission operates using at least one or more of the further operating modes:
   a "sum" mode in which the activated windings are actuated with a PWM signal in such a way that the winding current can be raised to implement the "starter" and "booster" functions; and
   a "difference" mode in which the activated windings are actuated with a PWM signal in such a way that the winding current can be lowered to implement the "generator" functions for a vehicle electrical system, or "regenerative braking" functions.

10. A method according to claim 9, characterized in that the power source is an input motor and the adjuster, with the input motor running, is synchronized with its frequency, and energy is thus added or removed in this manner at equal-phase or opposed phase voltage in the winding.

11. A method according to claim 8, characterized in that the power source is an input motor and the adjuster, with the input motor running, is synchronized with its frequency, and energy is thus added or removed in this manner at equal-phase or opposed phase voltage in the winding.

12. A transmission according to claim 1, characterized in that the number of poles of the input rotor (7) and the coaxial stator (2) differs by 2.

13. A transmission according to claim 1, characterized in that the current induced in the short-circuited windings is utilized to charge a battery, the transmission thus functioning as a generator.

14. A transmission according to claim 1, characterized in that the number of poles of the input rotor (7) and the coaxial stator (2) differs by 2.

15. A transmission according to claim 14, characterized in that the number of poles of the input rotor (7) is 22 poles and that of the coaxial stator (2) is 24 poles.

16. A transmission according to claim 1, wherein said magnets of said input rotor are permanent magnets.

* * * * *